(12) United States Patent
Trottier et al.

(10) Patent No.: US 8,900,455 B2
(45) Date of Patent: Dec. 2, 2014

(54) FILTER ASSEMBLY

(75) Inventors: Keith D. Trottier, Moorpark, CA (US); Charles N. Carter, Oxnard, CA (US); Christopher A. Meissner, Camarillo, CA (US); Werner Curt Fischer, Ojai, CA (US)

(73) Assignee: Meissner Filtration Products, Inc., Camarillo, CA (US)

( * ) Notice: Subject to any disclaimer, the term of this patent is extended or adjusted under 35 U.S.C. 154(b) by 937 days.

(21) Appl. No.: 13/038,240

(22) Filed: Mar. 1, 2011

(65) Prior Publication Data

US 2011/0215043 A1 Sep. 8, 2011

Related U.S. Application Data

(60) Provisional application No. 61/309,807, filed on Mar. 2, 2010.

(51) Int. Cl.
*B01D 35/153* (2006.01)
*B01D 27/08* (2006.01)
*B01D 29/31* (2006.01)
*B01D 35/30* (2006.01)

(52) U.S. Cl.
CPC .............. *B01D 29/31* (2013.01); *B01D 35/153* (2013.01); *B01D 35/30* (2013.01)
USPC ............................ 210/234; 210/237; 210/435

(58) Field of Classification Search
CPC ............... B01D 2201/4015; B01D 2201/4023; B01D 2265/028; B01D 2271/02; B01D 2279/51; B01D 35/31; B01D 46/0091; B01D 2201/301; B01D 2201/307; B01D 2201/304; B01D 29/31; B01D 35/30; B01D 35/157; B01D 35/1573; B01D 63/08; B01D 63/082; B01D 46/0023; B01D 46/0024; B01D 46/0025; B01D 2267/30; B01D 2267/60; B01D 2271/022; B01D 2313/18; B01D 2313/20; B01D 2313/21; B01D 2319/02; B01D 2319/025
USPC ......... 210/232, 233, 234, 235, 237, 435, 437, 210/442, 446, 314, 330, 331, 335, 346, 418, 210/429, 450, 488, 489, 321.72, 321.75, 210/321.84; 137/315.01, 315.11, 315.13, 137/315.14, 315.15, 315.16, 315.35, 315.4; 55/481, 482, 485, 490; 96/8
See application file for complete search history.

(56) References Cited

U.S. PATENT DOCUMENTS

| 5,103,857 | A | * | 4/1992 | Kuhn et al. | ............... 137/315.13 |
|---|---|---|---|---|---|
| 7,101,412 | B2 | * | 9/2006 | Gossweiler | ..................... 55/502 |
| 7,213,595 | B2 | * | 5/2007 | Capon et al. | ............. 128/205.27 |
| 7,335,298 | B2 | * | 2/2008 | Axelrod | ................... 210/167.22 |
| 2006/0096934 | A1 | * | 5/2006 | Weinberger et al. | .......... 210/791 |

* cited by examiner

*Primary Examiner* — Nam Nguyen
*Assistant Examiner* — Claire Norris
(74) *Attorney, Agent, or Firm* — Christie, Parker & Hale, LLP

(57) ABSTRACT

A filter assembly for filtering a fluid. The filter assembly at least one filter in a housing, an inlet lid mounted over the filter housing and including an inlet for the inlet of fluid into the housing, and an outlet lid mounted over the filter housing and including an outlet for the outlet of fluid from the housing. The assembly also includes an inlet plunger adapted for sealing flow from the inlet when the inlet plunger is biased to a first sealing position, and an outlet plunger adapted for sealing flow to the outlet when the outlet plunger is biased to a first sealing position.

15 Claims, 22 Drawing Sheets

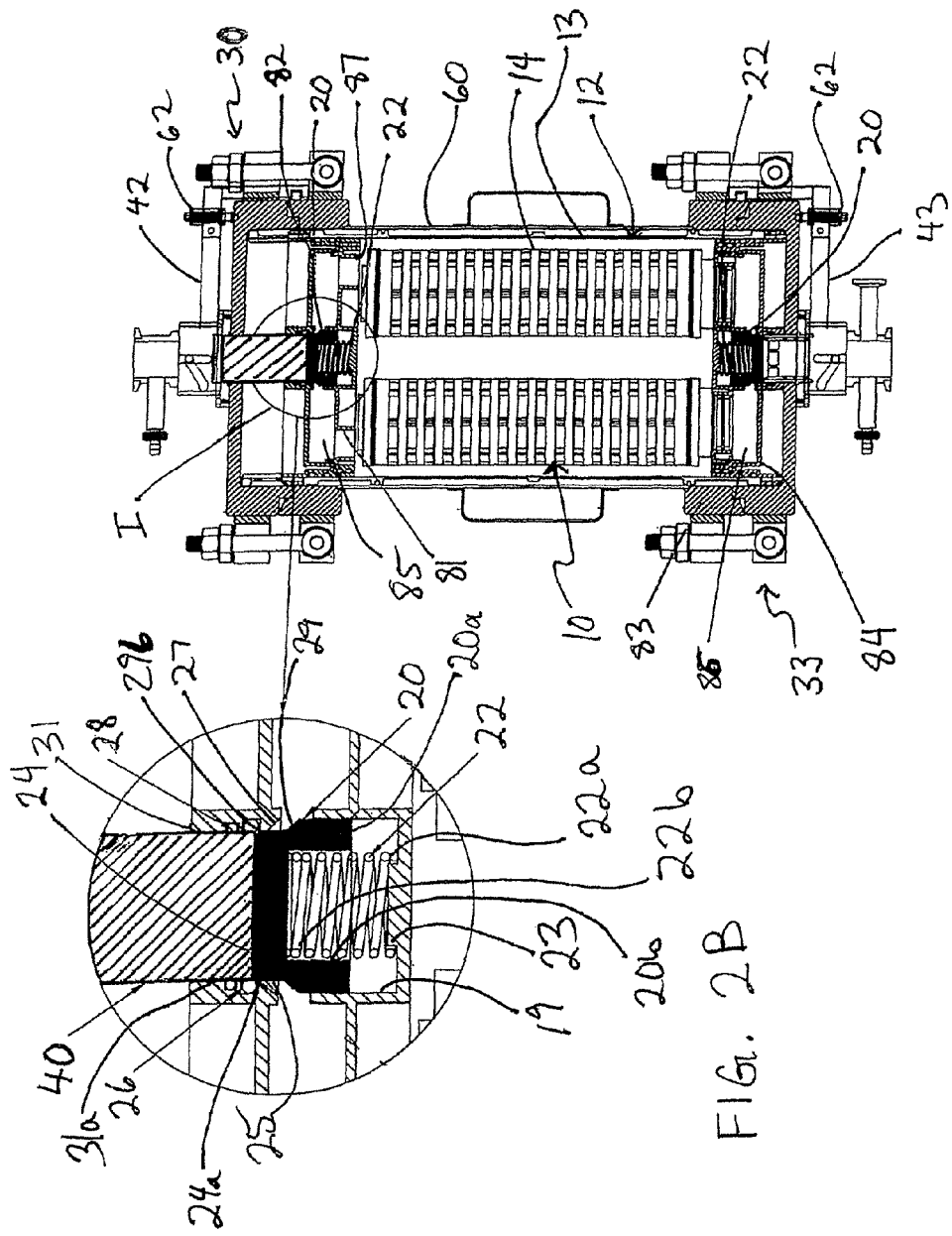

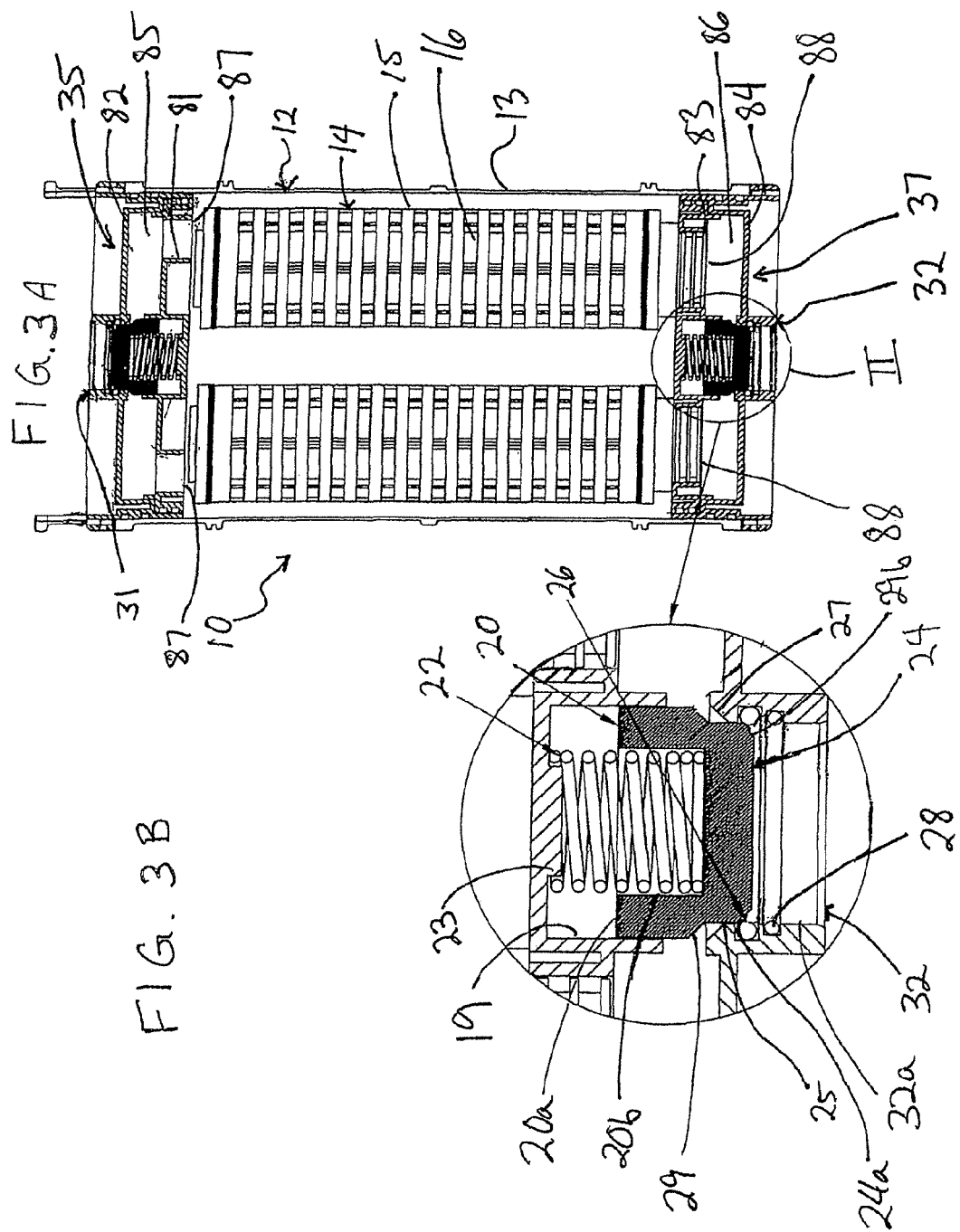

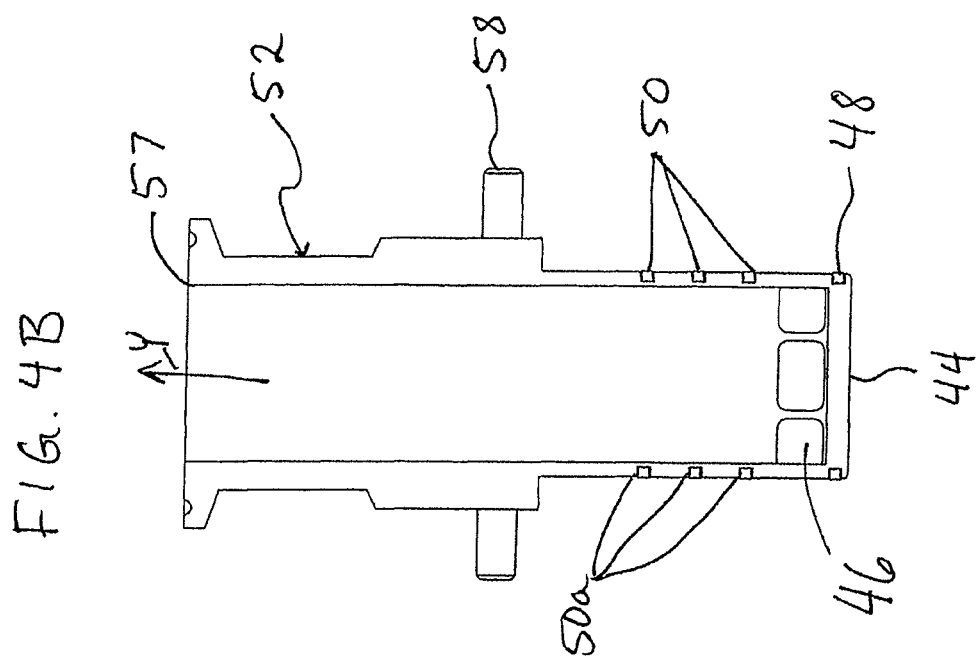

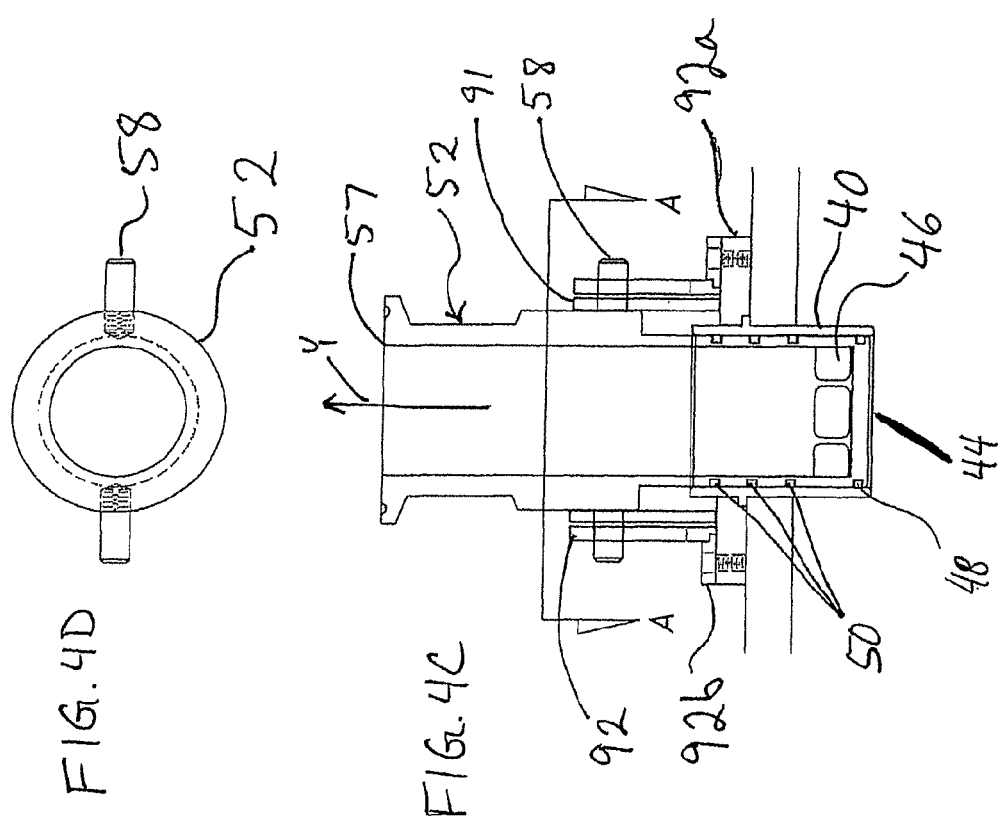

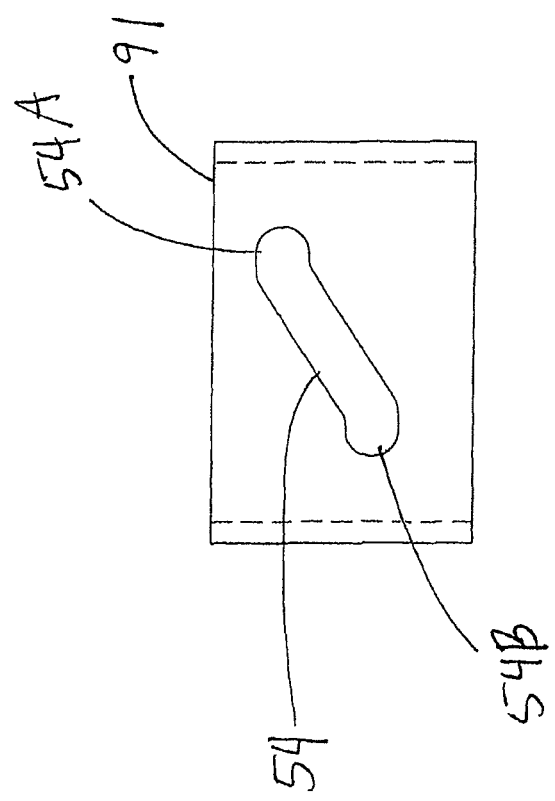

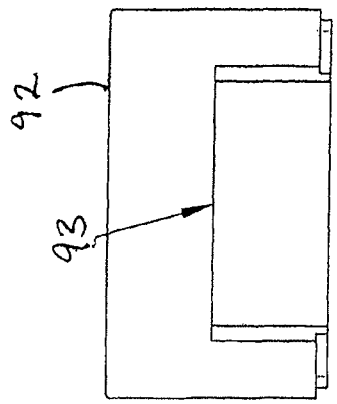
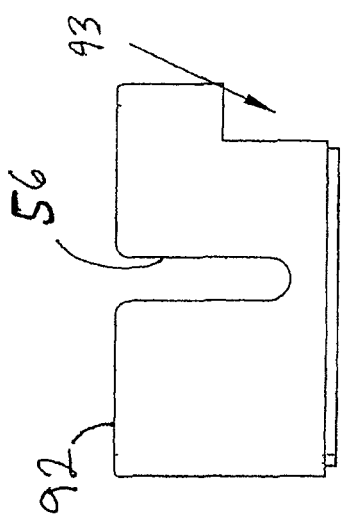

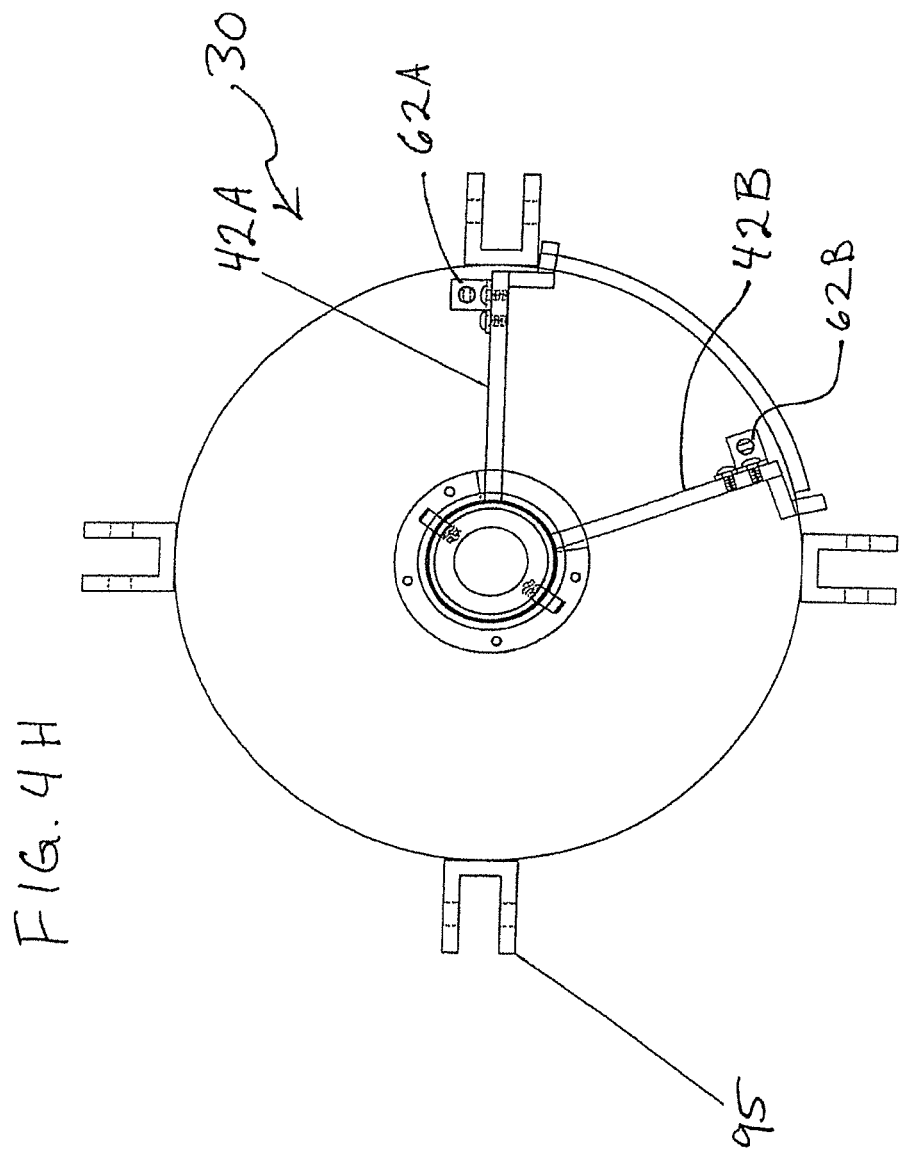

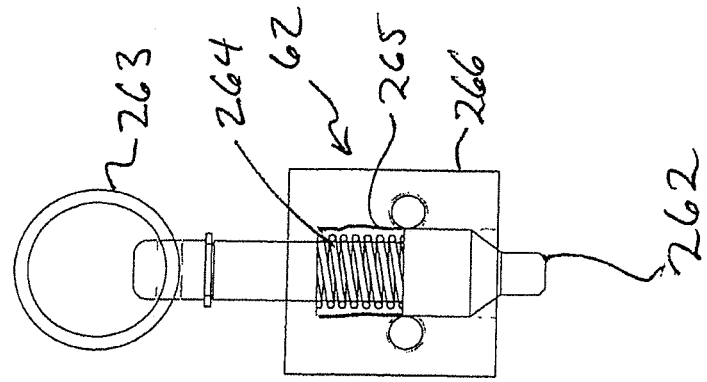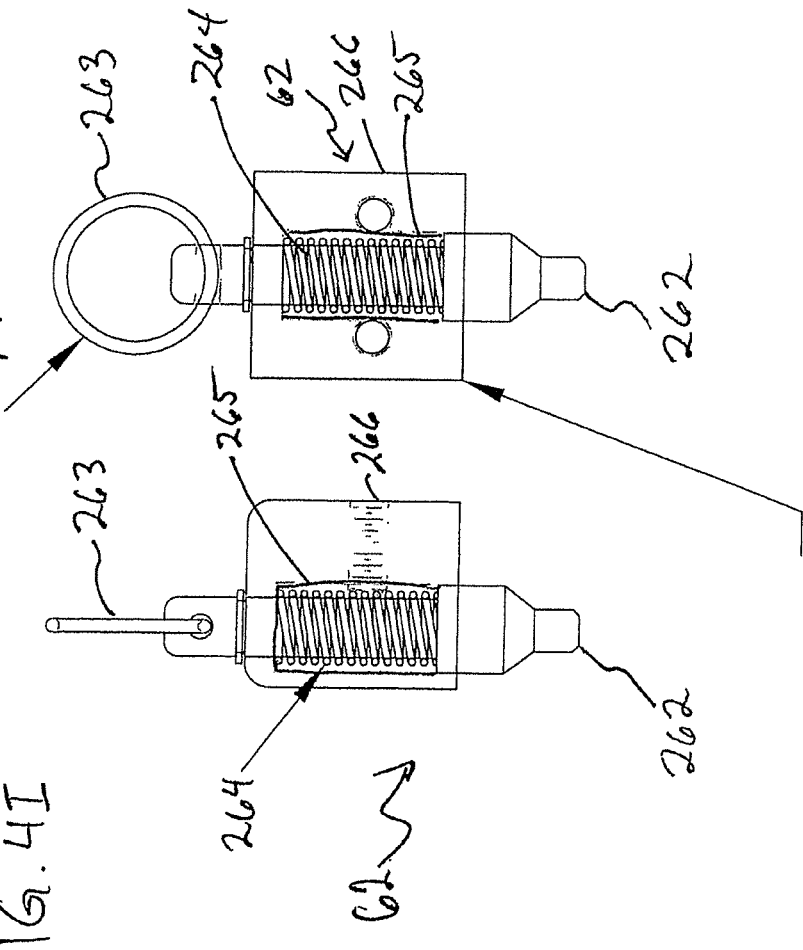

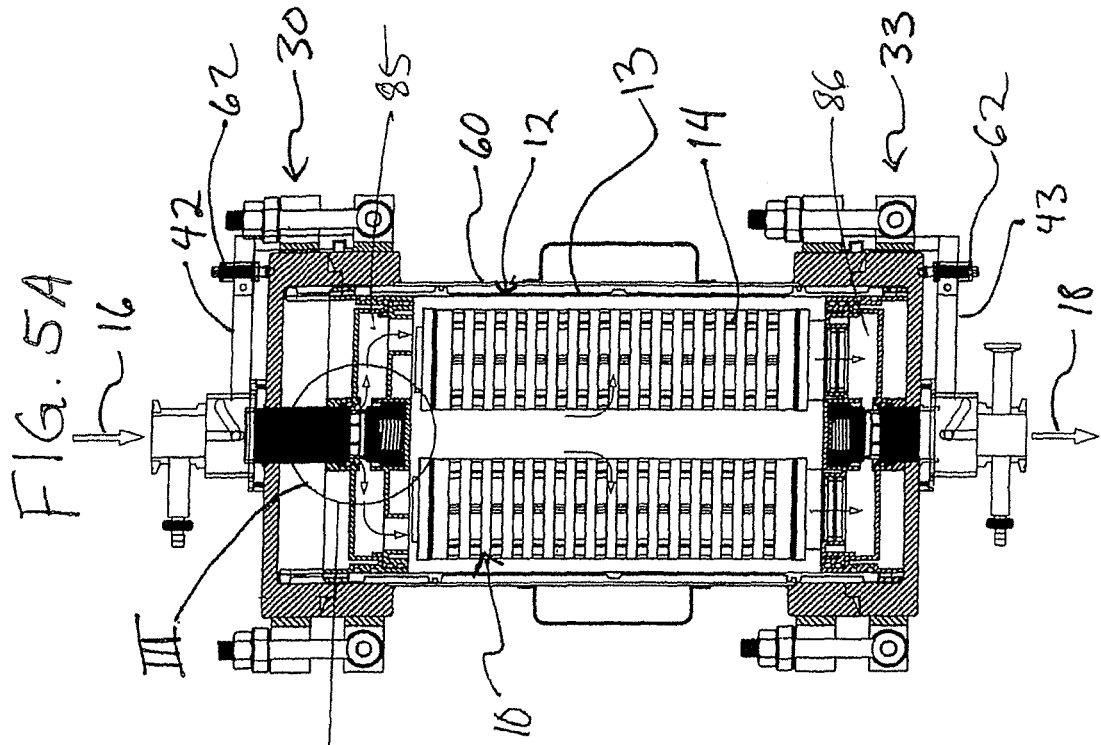
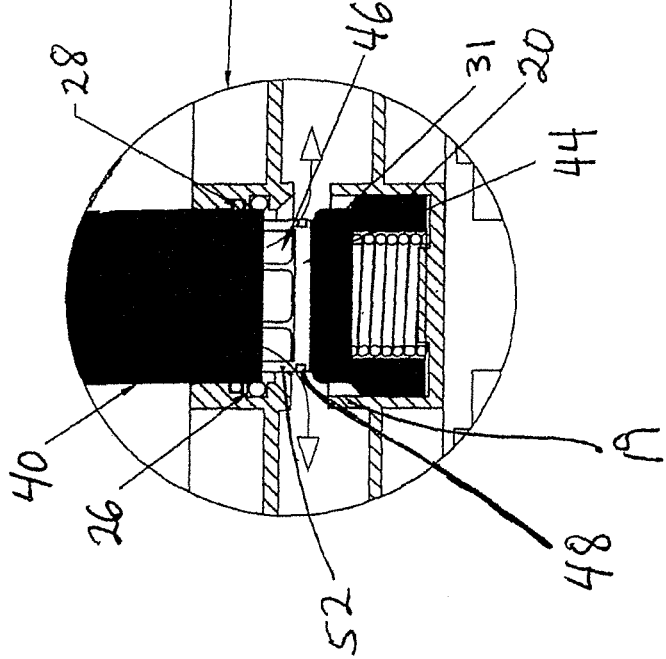

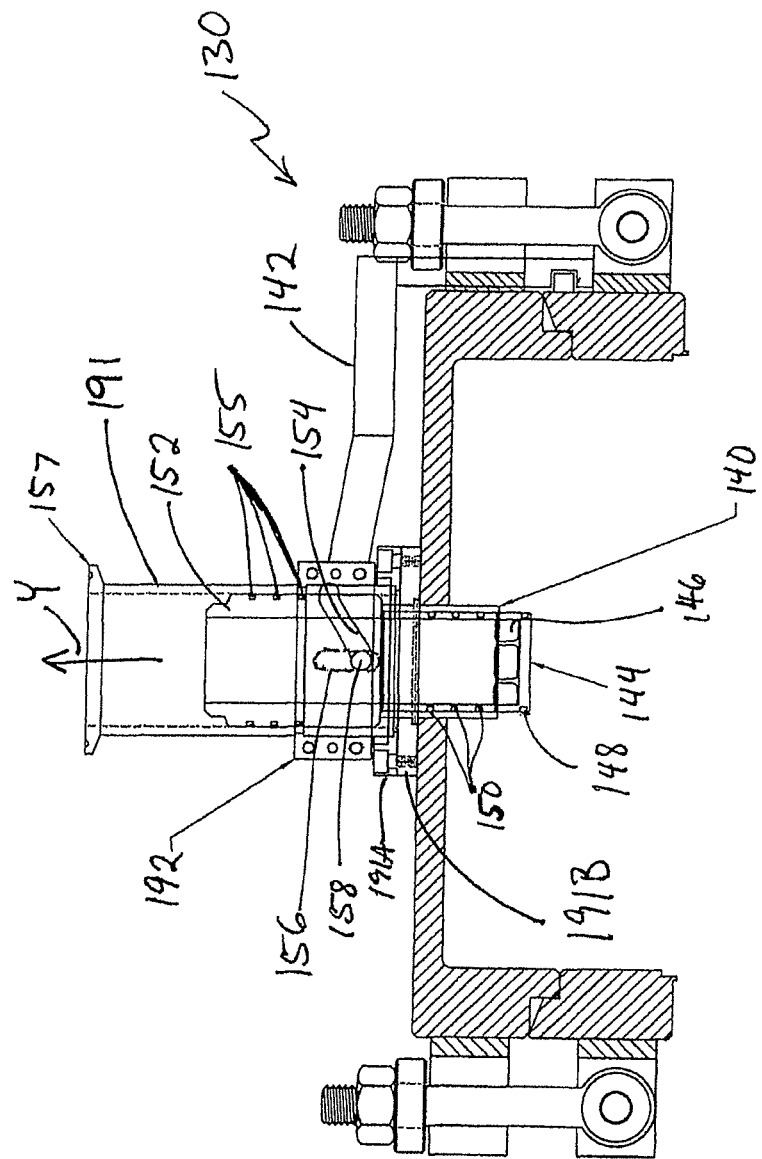

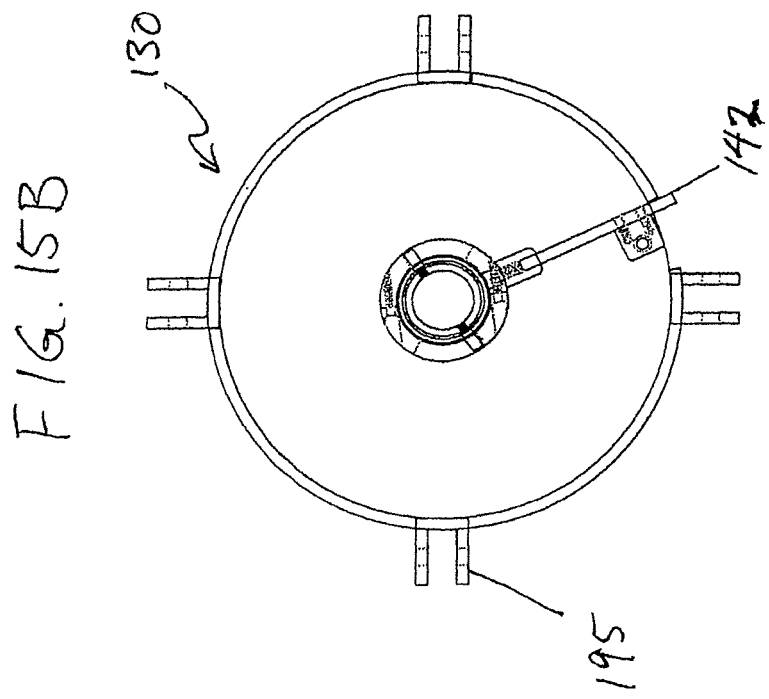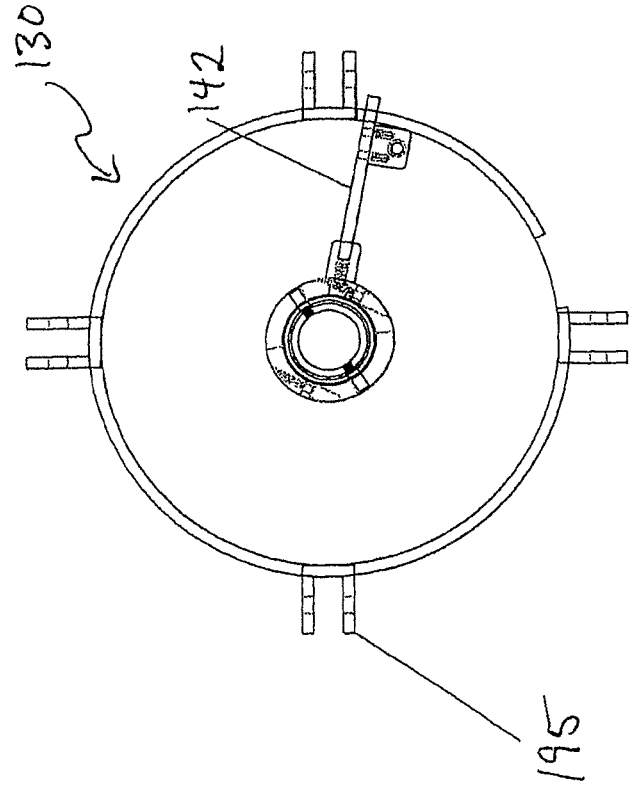

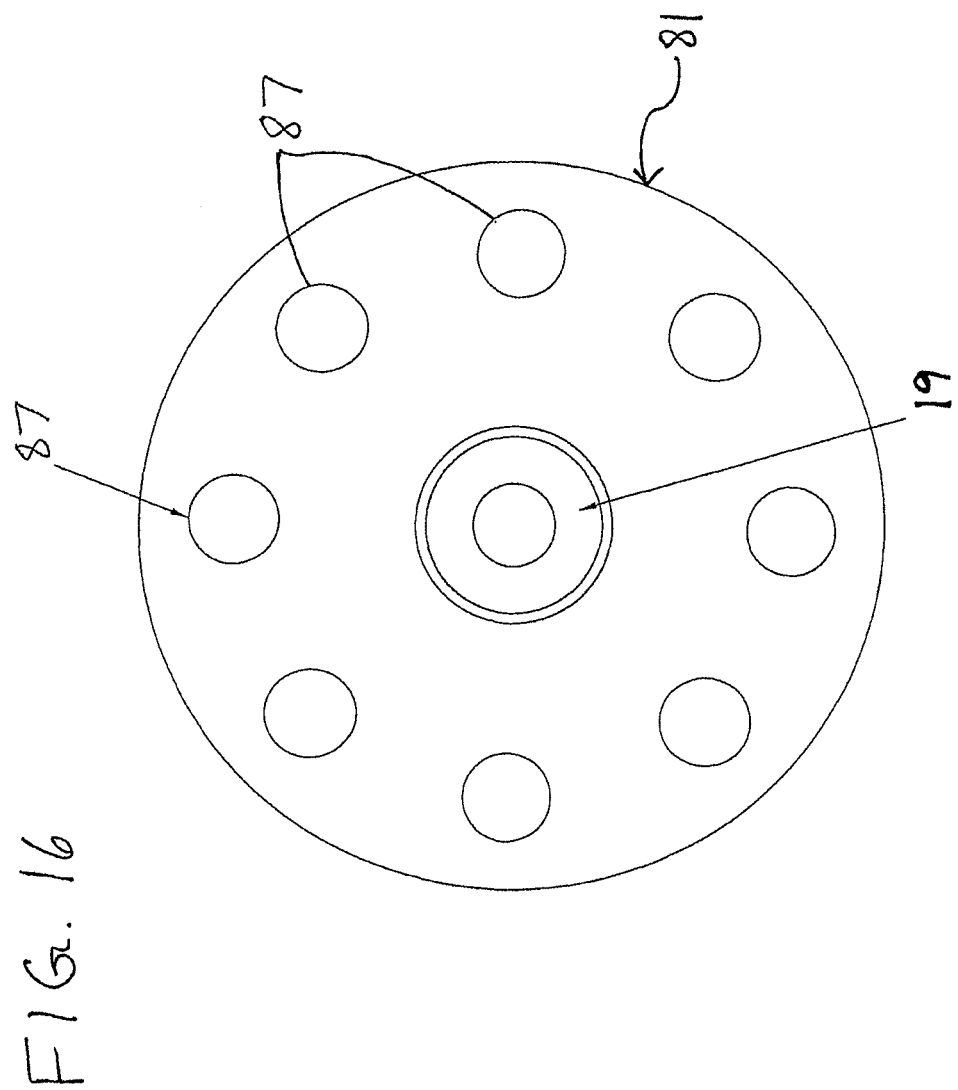

FILTER ASSEMBLY

CROSS-REFERENCE TO RELATED APPLICATION

This application claims the benefit of and priority to U.S. Provisional Application No. 61/309,807, filed on Mar. 2, 2010, the contents of which are fully incorporated herein by reference.

FIELD OF THE INVENTION

The present invention relates to a filter assembly, and, more particularly, to a disposable filter assembly for filtering fluids.

BACKGROUND

Filter assemblies filter fluids, such as chemicals and/or biological components utilized in the pharmaceuticals industry. Filter assemblies typically have an inlet through which the fluids enter into the filter assembly and an outlet through which the fluids exit the filter assembly. However, the fluids or gases emitted by the fluids may be toxic to the operator and/or the environment, and it may be difficult to prevent escape of the fluids or gases generated by the fluids when replacing the filters. Consequently, such filter assemblies may need to be located in rooms with sensor alarms that alert if there is a leak. Further, when the filters in the filter assemblies are changed, such change may have to occur in a sealed room, or the facility may need to be evacuated and a technician may have to wear a special breathing apparatus and/or special protection suit.

SUMMARY

An embodiment of the present invention provides a filter assembly for filtering a fluid. The filter assembly includes at least one filter in a filter housing, wherein the filter housing includes an inlet at a first end of the filter housing and an outlet at a second end of the filter housing. The filter assembly further includes a top plunger adapted to seal the inlet when the top plunger is pressed away from the at least one filter and into the inlet by a top spring, and a bottom plunger adapted to seal the outlet when the bottom plunger is pressed away from the at least one filter and into the outlet by a bottom spring. Additionally, the filter assembly includes a top housing lid adapted to mount on the filter housing, including a top handle and a top riser adapted to push the top plunger out of the inlet and towards the at least one filter when the top handle is in an open position; and a bottom housing lid adapted to mount on the filter housing, including a bottom handle and a bottom riser adapted to push the bottom plunger out of the outlet and towards the at least one filter when a bottom handle is in an open position.

Other features and advantages of the present invention will become apparent from the following detailed description, taken in conjunction with the accompanying drawings, which illustrate, by way of example, the features of the present invention.

SUMMARY OF THE INVENTION

In an exemplary embodiment, a filter assembly for filtering a fluid is provided. The filter assembly includes at least one filter in a filter housing, wherein the filter housing includes an inlet at a first end of the filter housing and an outlet at a second end of the filter housing. The assembly also includes an inlet plunger in the inlet which is adapted to seal the inlet, an outlet plunger in the outlet which is adapted to seal the outlet, an inlet lid adapted to mount on the filter housing, the inlet lid including an inlet riser adapted to push the inlet plunger out of the inlet and towards the at least one filter, and an outlet lid adapted to mount on the filter housing, the outlet lid including an outlet riser adapted to push the outlet plunger out of the outlet and towards the at least one filter. In another exemplary embodiment, the inlet plunger is pressed away from the at least one filter and into the inlet by an inlet spring, and the outlet plunger is pressed away from the at least one filter and into the outlet by an outlet spring. In yet another exemplary embodiment, the inlet lid further includes a first handle adapted to move the inlet riser towards the inlet plunger when the first handle is in an open position, and the outlet lid further includes a second handle adapted to move the outlet riser towards the outlet plunger when the second handle is in an open position. In a further exemplary embodiment, fluid can not flow through the filter assembly when the first handle is in a closed position and the second handle is in a closed position. In yet a further exemplary embodiment, fluid flows through the filter assembly when the inlet plunger is pushed out of the inlet and the outlet plunger is pushed out of the outlet. In one exemplary embodiment, when the inlet plunger is in the inlet and the outlet plunger is in the outlet, the fluid and vapors from the fluid are sealed inside the filter assembly. In another exemplary embodiment, the filter housing is received in an outer housing and the inlet lid is latched to one end of the outer housing and the outlet lid is latched to another end of the outer housing. In yet another exemplary embodiment the filter housing is disposable. In a further exemplary embodiment, the inlet riser further includes at least one opening for the fluid to flow through, and the outlet riser further includes at least one opening for the fluid to flow through. In yet a further exemplary embodiment, the inlet riser is pipe-shaped with a closed end towards the inlet plunger, and the outlet riser is pipe-shaped with a closed end towards the outlet plunger.

In another exemplary embodiment, a filter assembly for filtering a fluid is provided which includes at least one filter in a housing, an inlet lid mounted over the filter housing which includes an inlet for the inlet of fluid into the housing, and an outlet lid mounted over the filter housing which includes an outlet for the outlet of fluid from the housing. The filter assembly also includes an inlet plunger adapted for sealing flow from the inlet when the inlet plunger is biased to a first sealing position, and an outlet plunger adapted for sealing flow to the outlet when the outlet plunger is biased to a first sealing position. In yet another exemplary embodiment, the filter assembly also includes an inlet spring biasing the inlet plunger to the inlet plunger first sealing position and an outlet spring biasing the outlet plunger to the outlet plunger first sealing position. In another exemplary embodiment, the filter assembly further includes an inlet plenum in fluid communication with the inlet and an outlet plenum in fluid communication with the outlet, such that when the inlet plunger is in the first sealing position, a peripheral surface of the inlet plunger seals flow to the inlet plenum, and when the outlet plunger is in the first sealing position, a peripheral surface of the outlet plunger seals flow from the outlet plenum. In a further exemplary embodiment, the filter assembly also includes an inlet riser moveable relative to the inlet lid for urging the inlet plunger to a second position not sealing the flow from the inlet, and an outlet riser moveable relative to the outlet lid for urging the outer plunger to a second position not sealing the flow to the outlet. In yet a further exemplary embodiment, the filter assembly further includes a first handle coupled to the inlet lid and moveable between an open position and a closed position and adapted to move the inlet riser for moving the inlet plunger to the inlet riser second position when the first handle is in the open position, and a second handle coupled to the outlet lid and moveable between an open position and a closed position and adapted to move the outlet riser to the outlet riser second position when the second handle is in the open position. In another exemplary embodiment when the first handle is in the closed position, the inlet plunger is urged to the inlet plunger first sealing position, and when the second handle is in the closed position, the outlet plunger is urged to the outlet plunger first sealing position. In yet another exemplary embodiment, the housing is received in an outer housing and the inlet lid is latched to one end of the outer housing and wherein the outlet lid is latched to another end of the outer housing. In an exemplary embodiment, the filter assembly further includes an inlet riser post through the inlet lid and an outlet riser post through the outer lid, such that the inlet riser is moveable relative to the inlet lid by sliding within the inlet riser post and the outlet riser is moveable relative to the outlet lid by sliding within the outlet riser port. In another exemplary embodiment, the inlet riser includes at least an opening for the fluid to flow through, and the outlet riser includes at least an opening for the fluid to flow through. In yet another exemplary embodiment, the inlet riser is pipe-shaped with a closed end towards the inlet plunger, and wherein the outlet riser is pipe-shaped with a closed end towards the outlet plunger. In yet a further exemplary embodiment, the filter housing is disposable.

BRIEF DESCRIPTION OF THE DRAWINGS

FIG. 2A is a cross-sectional view of the filter assembly of FIG. 1 where the housing lid is attached.

FIG. 2B is an enlarged view of area I of FIG. 2A

FIG. 3A is a cross-sectional view of the filter assembly of FIG. 1 where the plunger is in a closed position.

FIG. 3B is an enlarged view of area II of FIG. 3A.

FIG. 4B is a cross-sectional view of a riser of the upper housing lid of FIG. 4A.

FIG. 4C is a partial cross-sectional view of the upper housing lid of FIG. 4A.

FIG. 4D is a cross-sectional view along arrow AA of FIG. 4C.

FIG. 4E is a cross-sectional view of an angled slot retainer of the upper housing lid of FIG. 4A.

FIG. 4F is a front view of a vertical slot retainer of the upper housing lid of FIG. 4A.

FIG. 4G is a side view of the vertical slot retainer shown in FIG. 4F of the upper housing lid of FIG. 4A.

FIG. 4H is a top view of the upper housing lid of FIG. 4A.

FIG. 4I is a cross-sectional side view of an extended set pin of the upper housing lid of FIG. 4A.

FIG. 4J is another cross-sectional side view of an extended set pin of the upper housing lid of FIG. 4A.

FIG. 4K is a cross-sectional side view of a retracted set pin of the upper housing lid of FIG. 4A.

FIG. 5A is a cross-sectional view of the filter assembly in the housing assembly of FIG. 1 where the plunger is in the open position.

FIG. 5B is an enlarged view of area III of FIG. 5B.

FIG. 9 is a cross-sectional view of an upper housing lid where a riser is extended according to another embodiment of the present invention

FIG. 15A is a top view of the housing lid of FIG. 9 where a handle is in an open position.

FIG. 15B is a top view of the housing lid of FIG. 9 where the handle is in a closed position.

FIG. 16 is a top view of an upper inner wall of the filter assembly of FIG. 1.

DETAILED DESCRIPTION

The detailed description set forth below in connection with the drawings is intended as a description of embodiments of a filter assembly in accordance with the present invention and is not intended to represent the only forms in which the invention may be constructed or utilized. It is to be understood that the same or equivalent functions and structures may be accomplished by different embodiments that are also intended to be encompassed within the spirit and scope of the invention. As denoted elsewhere herein, like element numbers indicate like elements or features.

Figure 1:
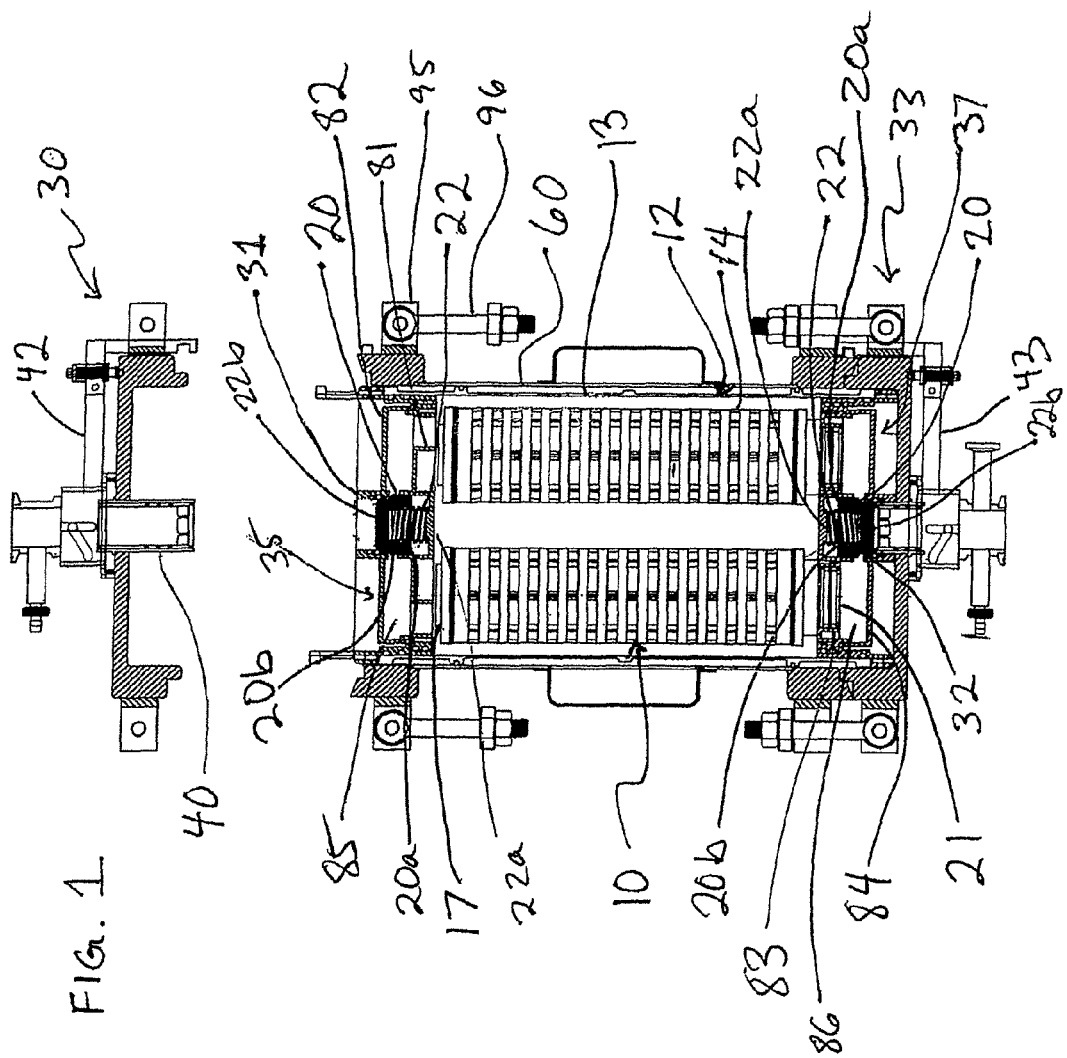
FIG. 1 is a cross-sectional view of a filter assembly in a housing assembly where a plunger is closed and an upper housing lid is removed according to an embodiment of the present invention.
Figure 8:
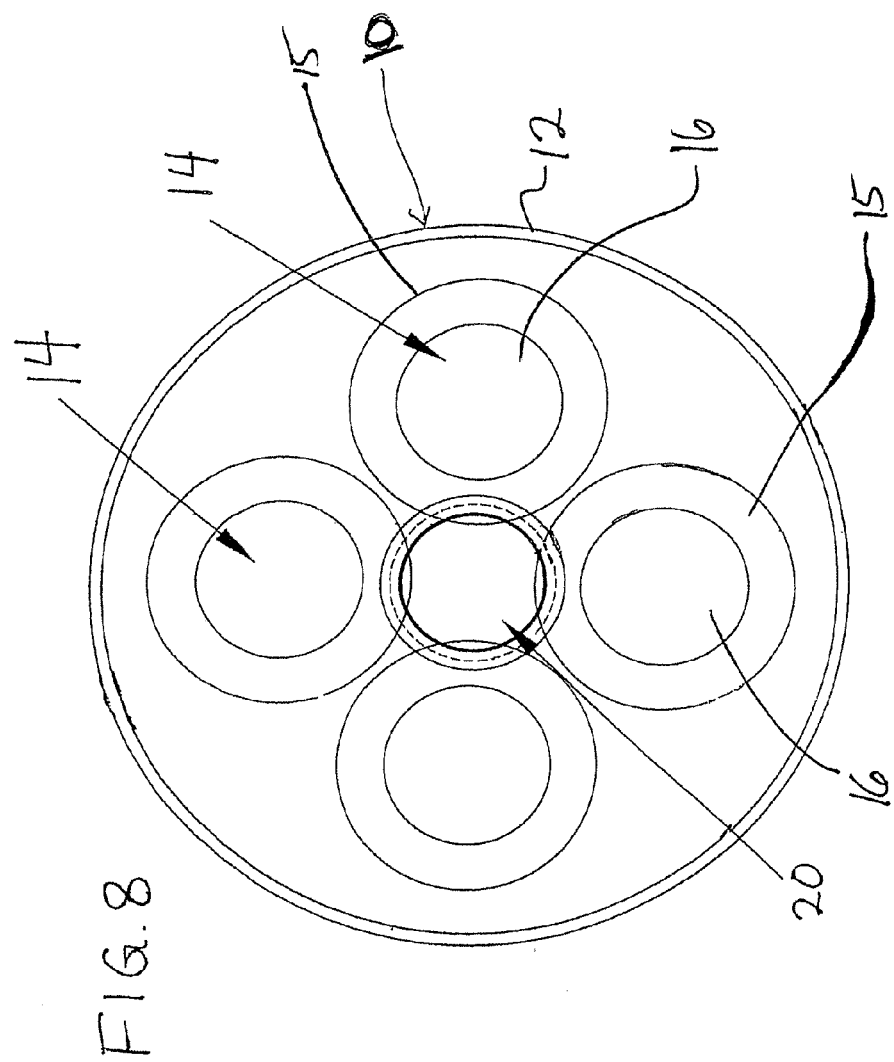
FIG. 8 is a top schematic view of the filter assembly of FIG. 1.
Figure 10A:
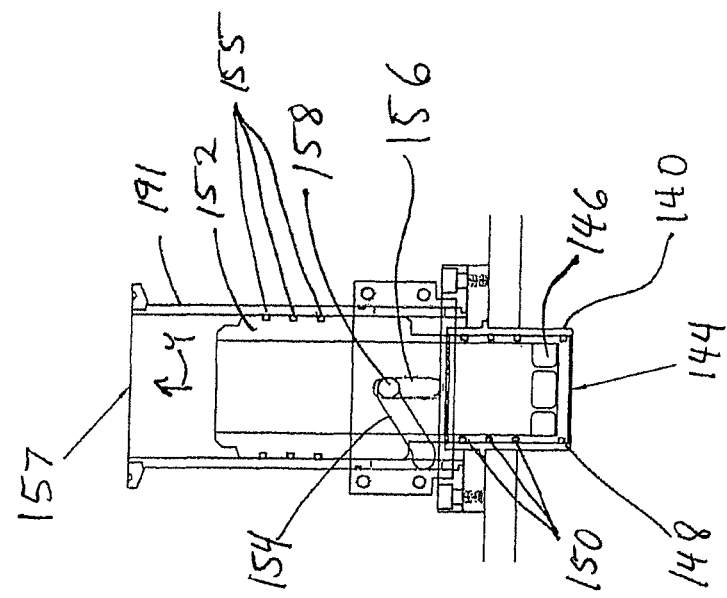
FIG. 10A is a partial cross-sectional view of a portion of the upper housing lid of FIG. 9 where the riser is extended.
Figure 10B:
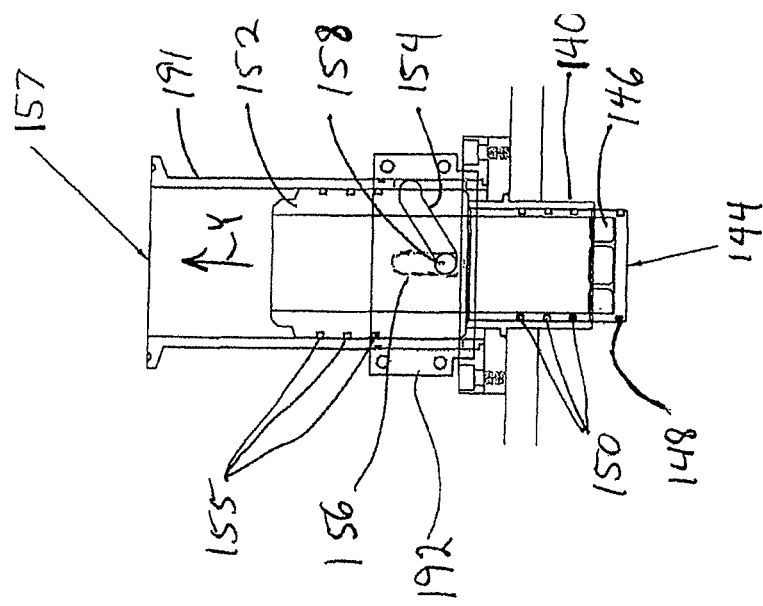
FIG. 10B is a partial cross-sectional view of a portion of the upper housing lid of FIG. 9 where the riser is retracted.
Figure 11:
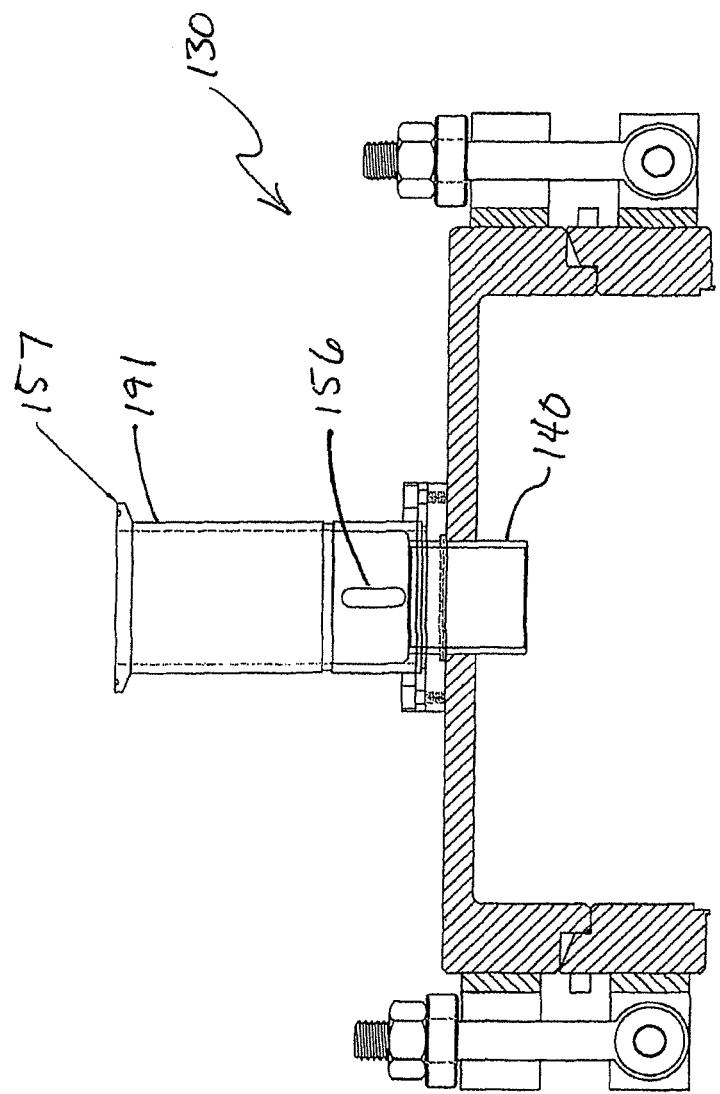
FIG. 11 is a cross-sectional view of the upper housing lid of FIG. 9 where the riser is removed.
Figure 12:
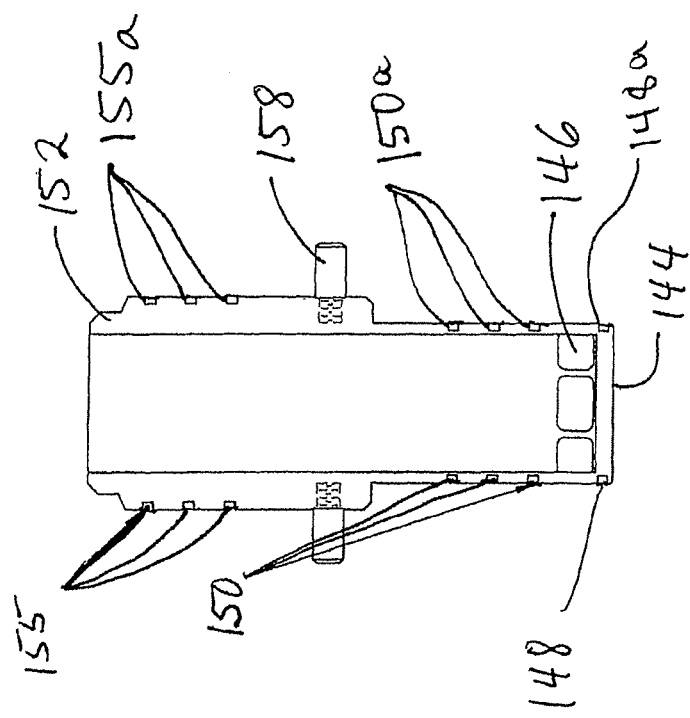
FIG. 12 is a cross-sectional view of the riser of the upper housing lid of FIG. 9.

An embodiment of the present invention, as shown in FIGS. 1-8, provides a filter assembly 10 for filtering fluids, such as fluids utilized in manufacturing pharmaceuticals and chemicals, where the fluids and/or vapors from the fluids may be toxic or may cause contamination if released to the atmosphere. The filter assembly 10 includes at least one filter 14, e.g., a cylindrical filter, inside a filter housing 12, as shown in FIG. 1. Any suitable number of filters 14 may be inserted into the filter housing 12. For example, FIG. 8 shows four filters 14, but other numbers of filters may be utilized. Further, the filters may be stacked or may be positioned adjacent to one another. In one exemplary embodiment, the filters are between 10 inches and 50 inches high. Different types of filters may be utilized for filtering different types of fluids.

Exemplary types of filters that may be utilized include the Sterilux PVDF membrane filters and the Stylux PES membrane filters manufactured by Meissner Filtration Products, Inc. An adaptor may be used to accommodate a filter media to form a filter. In other word the filter media may be housed in an adaptor. An exemplary adaptor is the 222 O-ring adaptor, such as the model ST0.2-3C2S adaptor. The 222 O-ring adaptor is a typical configuration adaptor offered by submicron filter manufacturers. The 222 O-ring adaptor one end that is closed by a flat cap. This configuration forces fluid through the only available path through an open end of the adaptor and through the filter media. The fluid is then forced out through the center of the filter adaptor and the filter media. In another exemplary embodiment, filters may be thermally welded to the filter housing with use of adaptors.

Exemplary embodiment filters 14 are cylindrical, being defined by a cylindrical wall 15 about filtering material in a cylindrical inner space 16, as for example shown in FIG. 8. In one embodiment of the present invention, the top end 17 of the filter 14 is closed so that fluids move into the filter 14 from a space outside of the filter 14, through the filter wall 15 and into the inner space 16. Further, the bottom end 21 of the filter 14 is open so that fluids exit the filter 14 from inner space 16 through the bottom end 21 of the filter 14. In other words, fluids being filtered flow from the outside of the filter to the inside of the filter. However, one of ordinary skill in the art will appreciate that other suitable filter configurations may be utilized.

As shown in FIG. 3A, the cylindrically-shaped filter housing 12 has a peripheral cylindrical wall 13. Further, the filter housing 12 has an upper end cap 35 and a lower end cap 37 (FIG. 3A). Each of the upper and lower end caps 35 and 37 are sealingly mated with the cylindrical wall 13. The upper end cap 35 has an upper inner wall 81 and an upper outer wall 82 defining an upper plenum 85 there between. The lower end cap 37 has a lower inner wall 83 and a lower outer wall 84 defining a lower plenum 86 there between at the bottom of the filter housing 12 below the filters 14. The upper and lower end caps 35 and 37 are have locking tabs (not shown) that engage with the cylindrical wall 13 so that when pressed together they lock in place and do not disengage. O-rings in the upper and lower end caps 35 and 37 engage the cylindrical wall 13 to prevent leaks. However, in another embodiment of the present invention, the upper and lower end caps 35 and 37 may be fusion welded to the cylindrical wall 13.

As shown in FIGS. 2A, 2B, 3A, and 3B, both the upper and lower inner walls 81 and 83 each have a cylindrical cavity 19 for receiving a spring 22 and a cylindrical plunger 20, and for guiding movement of the plunger 20. A proximal end 22a of the spring 22 is press-fitted onto a mounting post 23 at a proximal end of the cavity 19. Proximal ends 20a of the plungers 20 have bores 20b, e.g., cylindrical openings, adapted to receive distal ends 22b of the springs 22. The plungers 20 are cylindrically-shaped and taper at tapered sections 29 to reduced diameter sections 25 towards distal ends 24 of the plungers 20, as shown in FIGS. 2B and 3B. The reduced diameter sections 25 further taper down slightly at tapered sections 29b towards the ends 24. Further, openings 87 are formed though the upper inner wall 81 that opens to a space about or adjacent to the filters 14, and the lower inner wall 83 has openings 88 that align with openings at the bottom of the filters 14, as shown in FIG. 3A. For example, the openings 87 may each be circular and may be arrayed in a circular pattern on the upper inner wall 81, as shown in FIG. 16. The openings 87 and 88 provide access to the upper and lower plenums, respectively.

The upper outer wall 82 has an inlet 31, formed by a cylindrical wall 31a, for receiving fluids, and the lower outer wall 84 has an outlet 32, formed by a cylindrical wall 32a, for transmitting fluids out of the filter assembly 10, as shown in FIGS. 3A and 3B. Annular grooves in the cylindrical wall 31a and the cylindrical wall 32a house sealing members 26 and 28, such as O-rings. As shown in FIGS. 2B, 3B, 5B, and 7B, an embodiment of the present invention provides two different sized sealing members 26, 28 at each of the inlet 31 and the outlet 32, where the larger sealing member 26 is located proximate to the smaller sealing member 28. However, one of ordinary skill in the art will appreciate that other sizes and numbers of sealing members may be utilized.

Further, the inlet 31 and outlet 32 both have a tapered stop 27 defined at proximal ends of the cylindrical walls of the inlet 31 and outlet 32. The shape of the tapered stop 27 corresponds to the shape of the tapered section 29 of the plunger 20 so that the plunger 20 can seat against the tapered section 29 of the inlet 31 so that the plunger 20 is prevented from moving distally beyond the tapered stop 27.

In FIGS. 2A, 2B, 3A, and 3B, the springs 22 are shown extended so that the springs 22 push the ends 24 of the plungers 20 away from the filters 14 into either the inlet 31 or the outlet 32. Hence, the reduced diameter sections 25 of the plungers are inside the inlet 31 or outlet 32. Here, an outer peripheral surface 24a of the distal end 24 of the plunger 20 engages the larger sealing member 26 to create a watertight and vapor-tight seal, as shown in FIG. 3B.

In an embodiment of the present invention, the inlet 31, the outlet 32, the plungers 20, and the sealing members 26, 28 are cylindrical or circular. However, the present invention is not limited thereto, and any suitable shape, such as an oval, may be utilized.

Figure 4A:
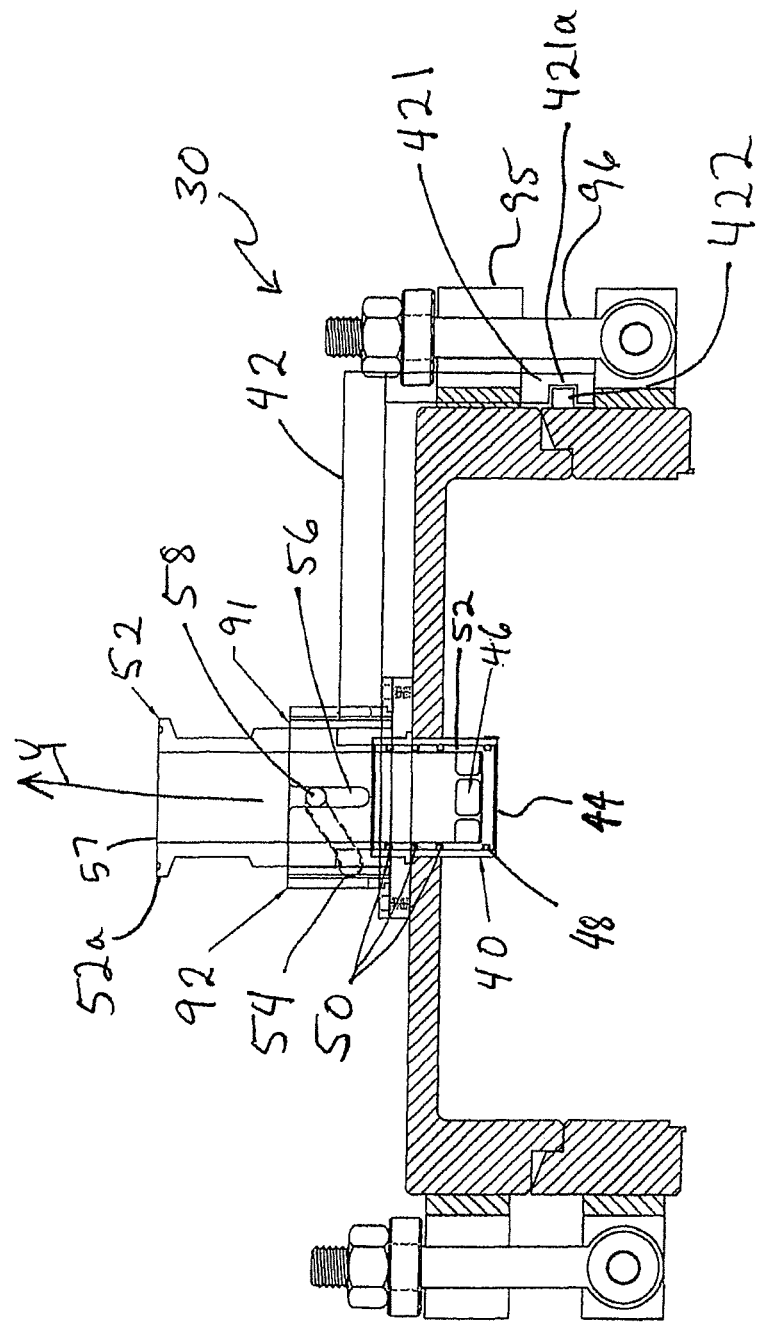
FIG. 4A is a cross-sectional view of the upper housing lid of the filter assembly of FIG. 1 where a riser is retracted.

FIG. 4A shows the upper housing lid 30 with a pipe-shaped riser post 40 about a riser 52 formed by a cylindrical wall, where a proximal closed end 44 of the riser 52 does not extend beyond the riser post 40. At a distal end 52a of the riser 52, there is a fluid conduit inlet 57, which connects to a fluid conduit for delivering fluids to the filter assembly 10. In an embodiment of the present invention, the fluid conduit inlet 57 at the distal end 52a of the riser 52 connects to a fluid conduit via a sanitary tri-clamp connection, flange connection or threaded connection. The inlet 57 shown in FIG. 4A is defined for a sanitary tri-clamp connection.

When the upper housing lid 30 is mated to the filter assembly 10, the riser post 40 is received in the inlet 31, as shown in FIG. 2B. Here, an outer perimeter surface of the riser post 40 engages the smaller sealing member 28 and the proximal end of the riser post 40 engages the larger sealing member 26. A proximal closed end 44 of the riser 52 contacts the plunger 20.

Further, the riser 52 has vents 46, e.g., rectangular openings (see FIG. 4B), formed through the cylindrical wall of the riser 52 proximate to the closed end 44 of the riser 52. Annular grooves 50a, shown in FIG. 4B, in the riser 52 house sealing members 50 at a proximal section of the riser 52 and an end riser sealing member 48 towards a proximal end of the riser 52. Here, the sealing members 48 and 50 create a watertight and vapor-tight seal between the riser 52 and the riser post 40. The sealing members 48 and 50 may be O-rings or any other suitable type of sealing member. In FIG. 4A, the riser 52 is shown retracted into the riser post 40 so that fluid can not flow out through the vents 46 to the filters 10, because the end riser sealing member 48 creates a seal between the riser 52 and the riser post 48 proximate to the vents 46.

Under ordinary operation, the larger sealing members 26 stops the movement of the plungers 20 away from the filters 14, as the larger sealing members have a smaller inner diameter than the outer diameter of the plunger distal ends 24. However, when removing the upper housing lid 30, a vacuum may form between the closed end 44 of the riser 52 and the plunger 20. During filtering, the closed end 44 of the riser and the plunger 20 are in contact. When the upper housing lid 30 is removed, a vacuum is formed until the riser post 40 disengages from sealing member 28. In an embodiment of the present invention, sealing member 28 is smaller than sealing member 26 to shorten the distance relative to the plunger 20 that the riser 52 must travel before disengaging from sealing member 28 and releasing the vacuum. If a vacuum condition does occur during upper housing lid 30 removal, the plunger 20 may be pulled distally further past the sealing member 26 by radially compressing the sealing member 26 until the plunger 20 contacts the tapered stop 27, which prevents further distal movement of the plunger 20. Further, the distal movement of the plunger 20 reduces the vacuum that forms prior to the riser post 40 disengaging with the sealing member 28 because the space between the plunger 20 and the closed end 44 of the riser 52 when the riser is just past the sealing member 28 is smaller.

In an embodiment of the present invention, the sealing members 26, 28, 48, and 50 are O-rings, which may be made from any suitable material. For example, the sealing members 26, 28, 48, and 50 may be quad seals, which have wiper blades, so that less force is required to provide a good seal. As a result such seals have longer operating lives, typically in excess of six months. However, the sealing members 26, 28, 48, and 50 eventually become worn out and must be replaced. Here, the entire housing lid with worn out sealing members 26, 28, 48, and 50 may be replaced with another housing lid, so that the worn out sealing members 26, 28, 48, and 50 may be replaced later and production is not slowed.

As shown in FIG. 4A, an upper handle 42, which controls the position of the riser 52, on the upper housing lid 30 is positioned in a closed position where the riser 52 is retracted into the riser post 40. In the closed position, when the upper housing lid 30 is mounted on the housing assembly 60, the closed end 44 of the riser 52 will contact the plunger 20, but will not push the plunger 20 toward the filter 14. Here, the handle 42 is attached to a rotatable angled slot retainer 91.

Pins 58 extend horizontally from the riser 52 on opposite sides of the riser 52, as shown in FIG. 4B. As shown in FIGS. 4C, 4E, 4F, and 4G, the pins 58 are sized so that the pins 58 engage an angled slot 54 in the rotatable angled slot retainer 91 positioned around the riser 52 and penetrate a vertical slot 56 in a fixed vertical slot retainer 92 positioned about the angled slot retainer 91. The handle 42 is attached to the angled slot retainer 91 and passes through a rectangular opening 93, shown in FIG. 4G, of the vertical slot retainer 92 that allows the handle 42 to be rotated about the longitudinal axis Y of the filter assembly 10. When the handle 42 is rotated, e.g., turned about 90 degrees about a longitudinal axis (e.g. axis Y), the angled slot retainer 91 is also rotated, and the pins 58 are engaged in and follow, or move along, the fixed vertical slots 56 and the rotating angled slots 54. When the handle 42 is rotated from the closed position to the open position, the pins 58 move along the rotating angled slots 54 from distal ends 54A of the angled slots 54 to proximal ends 54B of the angled slots 54, as shown in FIG. 4E. Therefore, the pins 58 move from a distal position to a proximal position, relative to the filters 14. As the pins 58 move to the proximal position, the riser 52 attached to the pins 58 is also moved to a proximal position. Here, the riser 52 slides through the riser post 40 to an extended position so that a proximal end of the riser 52 extends proximally beyond a proximal end of the riser post 40. Further, the vertical slots 56 in the fixed vertical slot retainer 92 prevent the pins 58 from rotating along with the handle 42 when the handle 42 and the angled slot retainer 91 are rotated, but allow the pins 58 to move vertically between distal and proximal positions. In the exemplary embodiment shown in FIG. 4C, the vertical slot retainer 92 is welded to a flange base 92b that bolts to a receiving flange 92a, which is welded to the top of the housing lid 30.

In another exemplary embodiment of the present invention, the upper handle 42 has a set pin 62 (FIG. 2A), such as a spring loaded pin, that may be inserted into at least two openings or indentations in the outer surface of the upper housing lid 30 towards the edges of the upper housing lid 30. For example, as shown in FIG. 4H, a first opening 62A corresponds to the upper handle 42A being in the open position and a second opening 62B corresponds to the upper handle 42B being in a closed position. Hence, the upper handles 42 may be fixed in either the open position, by positioning the set pin 62 in the first opening 62A, or the closed position, by positioning the set pin 62 in the second opening 62B. A nose 262 (FIGS. 4I, 4J, and 4K) of the extended set pin 62 seats into the first opening 62A or the second opening 62B. The set pin 62 may be retracted out of the opening 62A or 62B pulling up on a pull ring 263, which compresses a spring 264 in a cavity 265 in a set pin body 266. Once the set pin 62 has been retracted, the upper handle 42A may be rotated been open and closed positions. The set pin body 266 is attached the upper handle 42A, where the set pin body 266 may be attached with any suitable fastening device, such as bolts and nuts, or by welding.

The lower housing lid 33 with a lower handle 43 operates in a similar manner to the upper housing lid 30.

A person of ordinary skill in the art will appreciate that the housing lids may be adapted in various suitable methods, such as having a different number of pins or a different configuration for the pin retainers.

The filter assembly 10 may be inserted into a housing assembly 60. As shown in FIGS. 1, 2A, and 5A, the filter assembly 10 is inserted into a cylindrical housing assembly 60, which may be stainless steel or any other suitable material. Filter assemblies generally have a pressure rating that defines the pressures at which the filter assembly would be operable. Here, the pressure rating of the filter assembly 10 may be increased because the housing assembly 60 reinforces the filter housing 12. Exemplary operating pressures range from about 10 psi to about 125 psi. Exemplary operating temperatures range from about 15° C. to about 121° C.

In an embodiment of the present invention as shown in FIGS. 1 and 4A, to attach the housing lids 30, 33 to the housing assembly 60, swing bolts 96 connected to the housing assembly 60 may be distally rotated with respect to the filters 14 to engage dog-ear receptacles 95, and the swing bolts 96 may be tightened so that the housing lids 30, 33 are fixed to the housing assembly 60. The housing lids 30, 33 may be removed by loosening the swing bolts 96 and rotating them away from the dog-ear receptacles 95.

In another embodiment of the present invention, the filter assembly does not need to be inserted into a housing assembly. Here, the housing lids would be attached directly to the filter assembly.

To assemble the device, the lower housing lid 33 is attached to the housing assembly 60 as described above. Next, the filter assembly 12 is inserted into the housing assembly 60. Then, the upper housing lid 30 is attached to the housing assembly 60, as described above. Fluid conduits may then be connected to the upper and lower housing lids 30, 33.

Once the housing lids 30, 33 have been mounted on the housing assembly 60 and the handles 42 and 43 are in the closed position, fluid cannot flow through the inlet 31 and outlet 32. Here, the springs 22 urge the plungers 20 away from the filters 14 and into either the inlet 31 or the outlet 32 to prevent the flow of fluid or vapors so that there is a vapor-tight and fluid-tight seal. Further, fluid cannot pass between the inlet 31 and the riser post 40 because sealing members 26 and 28 create a seal between the outer perimeter of the riser post 40 and the inlet 31.

Figure 6:
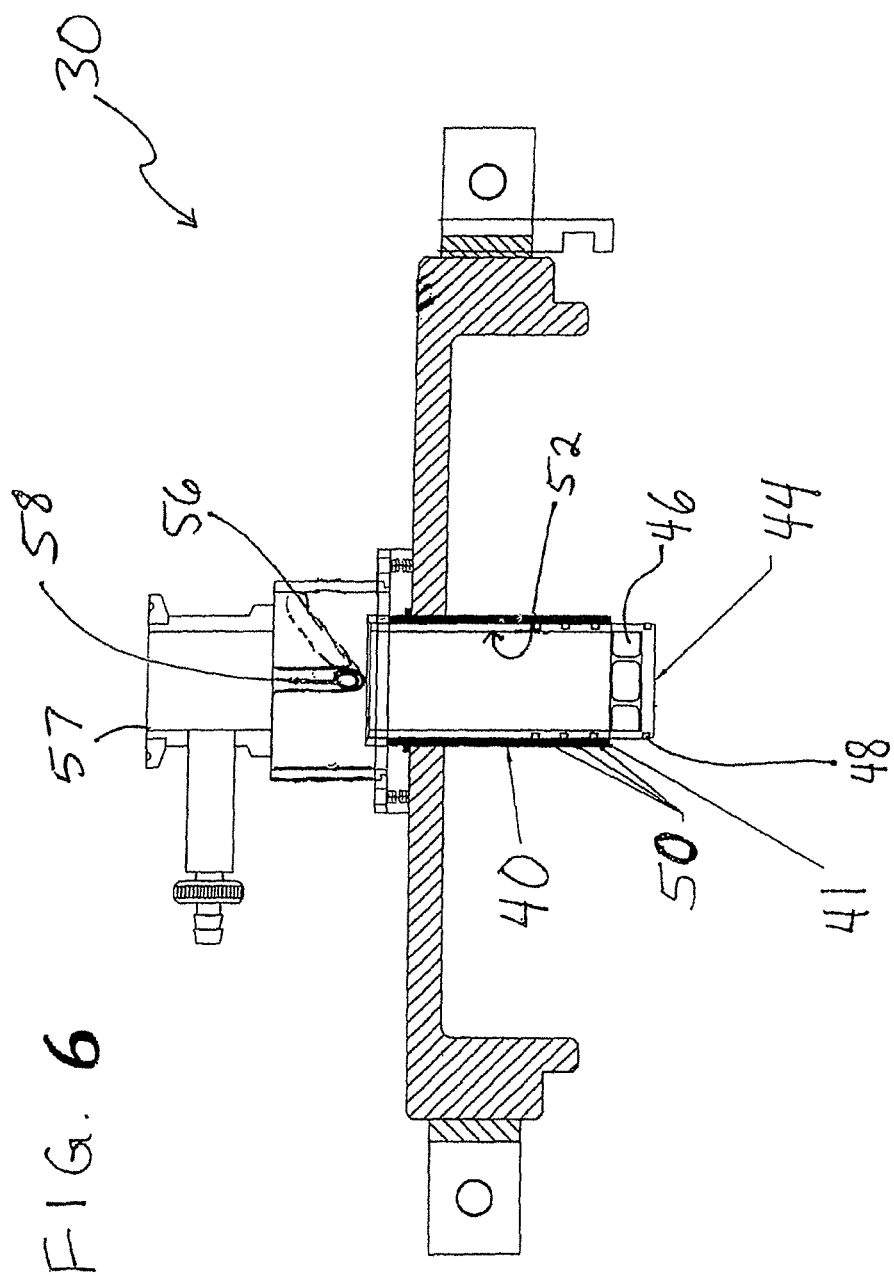
FIG. 6 is a cross-sectional view of the upper housing lid of the filter assembly of FIG. 1 where the riser is extended.
Figure 7:
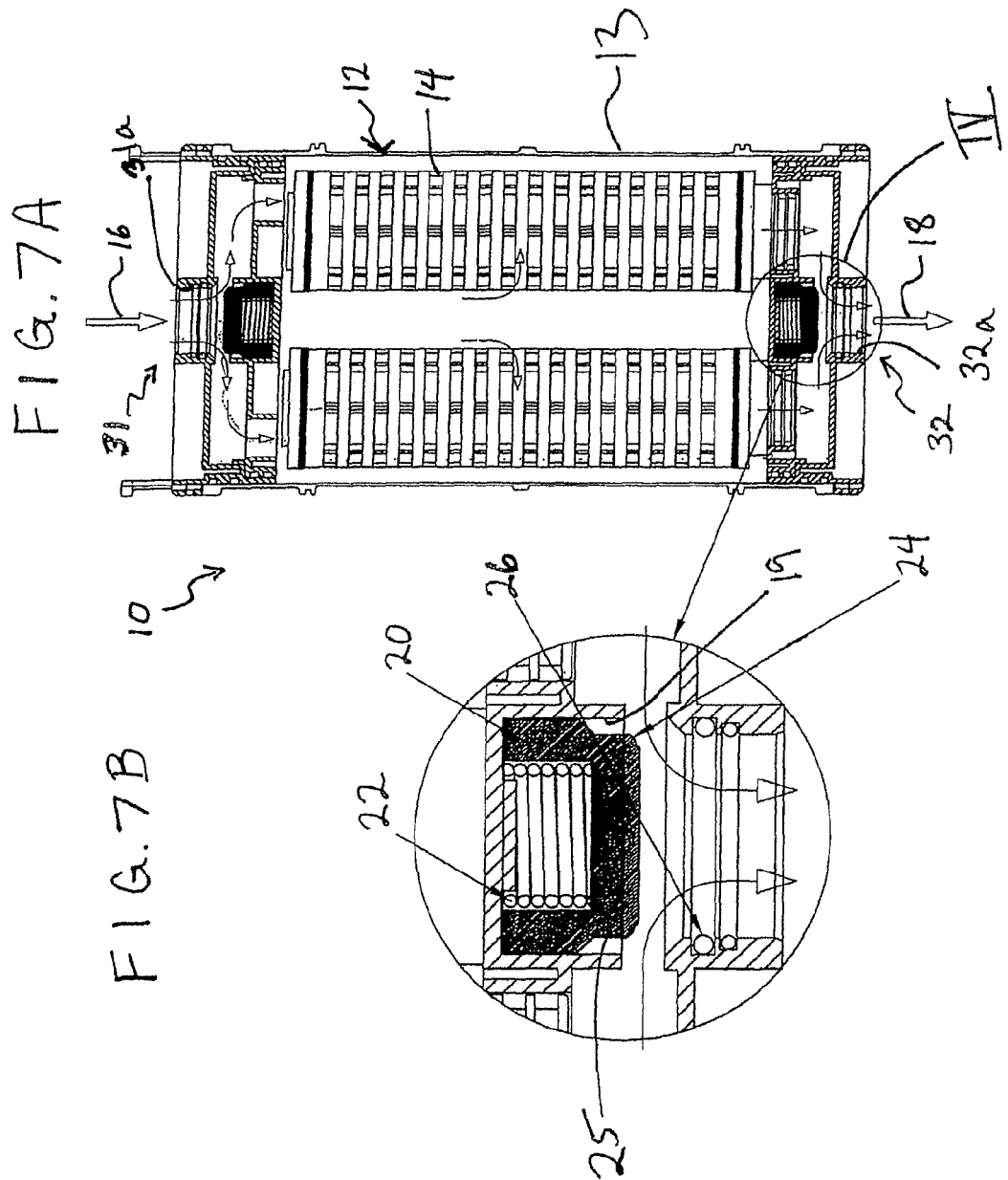
FIG. 7A is a cross-sectional view of the filter assembly of FIG. 1 where the plunger is in the open position.
FIG. 7B is an enlarged view of area IV of FIG. 7A.

As shown in FIGS. 5A, 5B, 6, 7A, and 7B, to begin filtering, the inlet 31 and outlet 32 are opened to allow flow of the desired fluid. Here, when the upper handle 42 is turned to the open position, the riser 52 slides through the center of the riser post 40, as described above, and the closed end 44 of the riser 52 pushes the plunger 20 towards the filters 14 and compresses the spring 22. As shown in FIG. 6, the riser 52 is now in an extended position with respect to the riser post 40.

Once the closed end 44 of the riser 52 pushes the plunger 20 away from the sealing member 26, the vents 46 are exposed below the riser post 40 so that fluid flows through the center of the riser 52 and the vents 46 into the upper plenum 85. As shown in FIG. 6, sealing members 50 prevent fluid from flowing back between the riser 52 and the riser post 40, and away from the filter 14. The outlet 32 is similarly opened so that fluid flows out of the filter assembly 10 through the outlet 32.

As shown in FIGS. 5A, 5B, 7A, and 7B, the arrows in the filter assembly 10 indicate the direction of the flow of the fluid through the filter assembly 10 when the inlet 31 and outlet 32 are open. Here, the fluid flows from the inlet 31 to the outside of the filters 14. The fluid then flows from the outside of the filters 14 to the center of the filters 14, and next flows out of the filters 14 into the lower plenum 86. Fluid then flows out through the outlet 32. The filters 14 are sealed at the top so that the fluid enters the filters 14 through the sides, and the filters 14 are open at their bottom so that the fluid may only exit the filter assembly 10 after the fluid has passed through the filters 14.

In one embodiment of the present invention, the filters 14 are cylindrical. However, one of ordinary skill in the art will appreciate that filters having other suitable shapes maybe utilized.

In an embodiment of the present invention, the filter assembly 10 is constructed so that it is not operable if the filter assembly 10 is inadvertently inserted into the housing assembly 60 upside down. For example, the upper riser post 40 may be a different length, shown in FIG. 5A as being longer, than the lower riser post. This feature may provide a longer operating lifespan, because operating the filter assembly 10 in a reverse direction from the intended direction may shorten the lifespan of the filter assembly 10.

In an embodiment of the present invention, the filter housing 12 and the plunger 20 may be formed of any suitable material, such as polypropylene and polyethylene, and may be formed of a chemically inert material, such as fluoropolymers (e.g., polyvinylidene fluoride) or fluorocarbons (e.g., polytetrafluoroethylene or perfluoroalkoxy).

In an embodiment of the present invention, the riser 52, the riser post 40, the housing lids 30, 33, and the springs 22 may be formed of any suitable material, such as a 316L stainless steel or a 304 stainless steel.

In an exemplary embodiment of the present invention, when the upper handle 42 is positioned in an open position, the housing lids 30, 33 may not be removed. When in the open position, the distal end 421 of the upper handle 42 extends proximally past the housing lid 30 and bends to capture an annular flange 422 that is attached to the housing assembly 60, as shown in FIG. 4A. The distal end 421 of the upper handle 42 has a slot 421a that mates with the flange 422 on the housing assembly 60. This flange 422 extends circumferentially around the housing assembly. The flange 422 has a break or opening positioned so that the opening corresponds to the upper handle 42 being in the closed position. Here, the distal end 421 of the upper handle 42 may disengage from the flange 422 only when at the flange breaks when the upper handle 42, and thus, the riser 52, are in the closed position. Hence, this is the only position where the lid 30 may now be removed. Otherwise, the distal end 421 of the upper handle 42 is engaged by the flange 422 when the upper handle 42 is rotated from the closed position, which prevents the upper housing lid 30 from being removed. The lower housing lid 33 operates in a similar manner.

To remove the housing lids 30, 33, the handles 42, 43 are turned to a closed position so that the risers 52 are retracted, which allows the springs 22 to press the plungers 20 into the openings of the inlet 30 or outlet 32 until the plungers 20 make contact with the first (larger) sealing members 26. The swing bolts 96 are loosened and rotated away from the dog-ear receptacles 95. The housing lids 30, 33 may then be pulled away from the housing assembly 60. Here, the riser posts 40 slide past these sealing members 26, 28 when the upper and lower housing lids 30 and 33 are removed.

As the upper and lower housing lids 30, 33 are removed and the riser posts 40 move away from the plungers 20, a vacuum is created until the riser posts 40 move beyond the second (smaller) sealing members 28 since air is not present between the closed end 44 of the riser 52 and the plunger 20. As a result, the plunger 20 is drawn up against the first sealing member 26. Once the riser post 40 disengages from the second sealing member 28, the vacuum is eliminated. Because the second sealing member 28 is smaller than the first sealing member 26, the space between the two sealing members 26 and 28 is reduced to a minimum so that the vacuum is eliminated as the plunger 20 engages the first sealing member 26 since the riser post 40 is then disengaging from the second sealing member 28. If the space between the two sealing members 26 and 28 was greater, the plunger 20 would fully engage the first sealing member 26 when the riser post 40 would still have some distance to travel before disengaging from the second sealing member 28. Because the volume of space between the plunger 20 and the riser post 40 would be greater if the space between the two sealing members 26 and 28 was greater, a higher vacuum condition would be created which would increase the difficulty in removing the housing lids 30 and 33, and would likely result in atomization and possible scattering of the liquid that is trapped in the interface.

Figure 13:
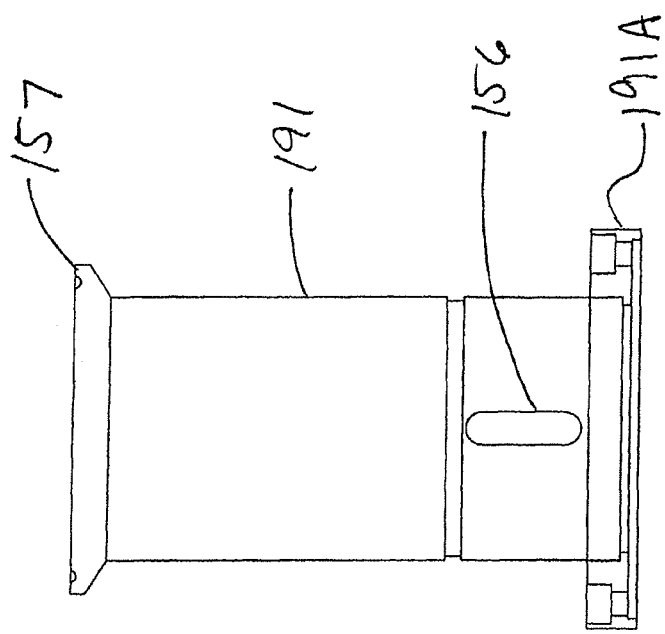
FIG. 13 is a front view of a vertical slot retainer of the upper housing lid of FIG. 9.
Figure 14B:
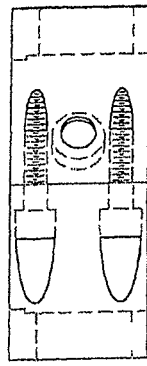
FIG. 14B is a side view of the angled slot retainer of FIG. 14A.
Figure 14A:
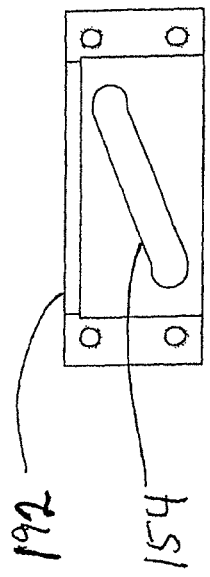
FIG. 14A is a front view of an angled slot retainer of the upper housing lid of FIG. 9.
Figure 14C:
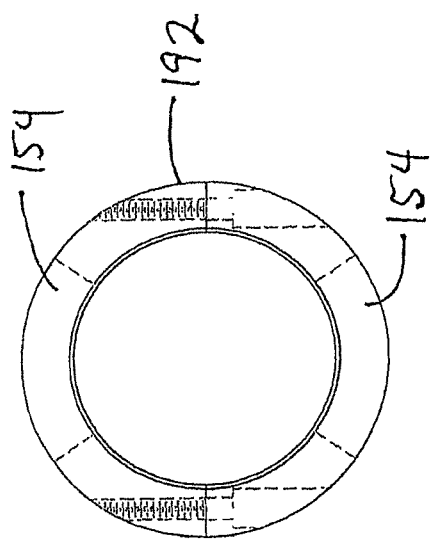
FIG. 14C is a top view of the angled slot retainer of FIG. 14A.

Another embodiment of the housing lid 130 of the present invention is shown in FIGS. 9-15. Here, a riser 152 extends through a riser post 140. Sealing members 150, 148 are located in annular grooves 148a, 150a, respectively, in the riser 152 to seal the riser 152 to the riser post 140, as similarly described above. The riser 152 also has pins 158 on opposite sides of a mid-section of the riser 152, as similarly described above. Here, a vertical slot retainer 191 is about the riser 152, and an angled slot retainer 192 is about the vertical slot retainer 191. The vertical slot retainer 191 is attached to a flange 191A below the vertical slot, as shown in FIG. 13. This flange 191A then bolts to a mating flange 191B, which is attached to the housing lid 130, as shown in FIG. 9.

The pins 158 extend through vertical slots 156 in the vertical slot retainer 191 and angled slots 154 in the angled slot retainer 192. An upper handle 142 attaches to the angled slot retainer 192. As similarly described above, as handle 142 is rotated about the longitudinal axis Y to the open position, the pins 158 follow both the vertical slots 156 and the angled slots 154. Here, the pins 158, and the riser 152 to which the pins 158 are attached, are pushed from a distal position to a proximal position. The closed end 144 of the riser 152 pushes the plunger 20 towards the filters 14, and vents 146 are exposed below the riser post 140 so that fluid may pass through the vents 146.

However, here the vertical slot retainer 191 extends past the end of the riser 152, and a fluid conduit inlet 157 at a distal end of the vertical slot retainer 191 attaches to the fluid source. Further, the riser 152 is sealed to the vertical slot retainer 191 by sealing members 155 positioned in annular grooves 155A in a distal section of the riser 152. Here, three sealing members 155 are shown, but one of ordinary skill in the art will appreciate that other suitable numbers of sealing members 155 may be utilized. In this embodiment, the inlet 157 is stationary as the handle 142 is turned and the riser 152 moves. The fluid conduit inlet 157 connects to the fluid conduit via a sanitary tri-clamp connection, flange connection, or threaded connection. A sanitary tri-clamp connection is shown in FIGS. 9, 10A, 10B, 11, and 13.

Although the present invention has been described though the use of exemplary embodiments, it will be appreciated by those skilled in the art that various modifications may be made to the described embodiments that fall within the scope and spirit of the invention as defined by the claims and their equivalents appended hereto. For example, aspects shown above with particular embodiments may be combined with or incorporated into other embodiments.

What is claimed is:

1. A filter assembly for filtering a fluid, the filter assembly comprising:
   at least one filter in a filter housing, wherein the filter housing comprises an inlet at a first end of the filter housing and an outlet at a second end of the filter housing;
   an inlet plunger in the inlet, wherein the inlet plunger is moveable between a first position blocking flow through the inlet and a second position allowing flow through the inlet;
   an outlet plunger in the outlet, wherein the outlet plunger is moveable between a first position blocking flow through the outlet and a second position allowing flow through the outlet;
   an inlet lid coupleable to the filter housing, the inlet lid comprising an inlet riser and inlet riser post, wherein the inlet riser is moveable between a retracted position, within the inlet riser post, and an extended position, extended beyond an end of the inlet riser post for moving the inlet plunger towards the second position for allowing flow through the inlet; and an outlet lid coupleable to the filter housing, the outlet lid comprising an outlet riser and outlet riser post, wherein the outlet riser is moveable between a retracted position, within the outlet riser post, and an extended position, extended beyond an end of the outlet riser post for moving the outlet plunger towards the second position for allowing flow through the outlet.

2. The filter assembly of claim 1, wherein the inlet plunger is pressed away from the at least one filter and into the inlet by an inlet spring, and wherein the outlet plunger is pressed away from the at least one filter and into the outlet by an outlet spring.

3. The filter assembly of claim 1, wherein the inlet lid further comprises a first handle adapted to move the inlet riser towards the inlet plunger when the first handle is in an open position, and wherein the outlet lid further comprises a second handle adapted to move the outlet riser towards the outlet plunger when the second handle is in an open position.

4. The filter assembly of claim 3, wherein fluid can not flow through the filter assembly when the first handle is in a closed position and the second handle is in a closed position.

5. The filter assembly of claim 1, wherein fluid flows through the filter assembly when the inlet plunger is pushed out of the inlet and the outlet plunger is pushed out of the outlet.

6. The filter assembly of claim 1, wherein when the inlet plunger is in the inlet and the outlet plunger is in the outlet, the fluid and vapors from the fluid are sealed inside the filter assembly.

7. The filter assembly of claim 1, wherein the filter housing is received in an outer housing, wherein the inlet lid is latched to one end of the outer housing, and wherein the outlet lid is latched to another end of the outer housing.

8. The filter assembly of claim 1, wherein the filter housing is disposable.

9. The filter assembly of claim 1, wherein the inlet riser further comprises at least one opening for the fluid to flow through, and the outlet riser further comprises at least one opening for the fluid to flow through.

10. The filter assembly of claim 1, wherein the inlet riser is cylindrically-shaped with a closed end towards the inlet plunger, and wherein the outlet riser is cylindrically-shaped with a closed end towards the outlet plunger.

11. The filter assembly of claim 10, wherein the inlet riser has peripheral wall and at least one opening through the inlet riser peripheral wall proximate the inlet riser closed end, and wherein the outlet riser has a peripheral wall and at least one opening through the outlet riser peripheral wall proximate the outlet riser closed end.

12. The filter assembly of claim 11, further comprising:
   a first inlet seal coupled to the inlet and sealing against an outer surface of the inlet riser;
   a second inlet seal coupled to the inlet and axially spaced from the first inlet seal, said second inlet seal sealing against the outer surface of the inlet riser;
   a first outlet seal coupled to the outlet and sealing against an outer surface of the outlet riser; and
   a second outlet seal coupled to the outlet and axially spaced from the first outlet seal said, second outlet seal sealing against the outer surface of the outer riser.

13. The filter assembly of claim 12, wherein the second inlet seal is closer to the inlet plunger than the first inlet seal and wherein the second outlet seal is closer to the outlet plunger than first outlet seal, wherein an inner diameter of the second inlet seal is smaller than an inner diameter of the first inlet seal, wherein when the inlet lid is not coupled to the filter housing the inlet plunger engages the second inlet seal, and wherein when the oulet lid is not coupled to the filter housing the outlet plunger engages the second outlet seal.

14. The filter assembly of claim 1, further comprising:
   a first inlet seal coupled to the inlet;
   a second inlet seal coupled to the inlet and axially spaced from the first inlet seal;
   a first outlet seal coupled to the outlet; and
   a second outlet seal coupled to the outlet and axially spaced from the first outlet seal.

15. The filter assembly of claim 14, wherein the second inlet seal is closer to the inlet plunger than the first inlet seal and wherein the second outlet seal is closer to the outlet plunger than first outlet seal, wherein an inner diameter of the second inlet seal is smaller than an inner diameter of the first inlet seal, wherein when the inlet lid is not coupled to the filter housing the inlet plunger engages the second inlet seal, and wherein when the oulet lid is not coupled to the filter housing the outlet plunger engages the second outlet seal.

* * * * *